Patented Oct. 26, 1926.

1,604,778

UNITED STATES PATENT OFFICE.

AUGUST KLAGES, OF MAGDEBURG-SUDOST, GERMANY.

ALKALI-METAL SALTS OF MERCURIZED PHENOLS FOR TREATING SEED.

No Drawing. Application filed October 17, 1923, Serial No. 669,018, and in Germany December 2, 1921.

My invention has reference to new compositions of matter for treating seed in order to destroy noxious agents such as bacteria and the like. According to my invention such compositions of matter contain alkali metal salts of mercurized phenols. These salts are prepared by treating solutions of the alkali metal salts of phenols or phenol compounds with mercuric oxide and evaporating to dryness in a vacuum.

The products obtained by this process are distinguished from those described by Dimroth, Berichte der deutschen chemischen Gesellschaft, vol. 35, page 2853 et seq., by their stability and lack of hygroscopic properties, so that they may be stored without the risk of decomposition. Their composition corresponds, in the case of ordinary phenol, to the formula

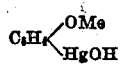

Me meaning an alkali metal.

For the purpose of treating seed in order to destroy noxious agents such as bacteria and the like, the mercurized products obtained in the manner described are mixed with neutral salts or other indifferent substances not acting upon the mercurized products in order to adjust the mercury content in such a manner that while a sufficient destructive action on bacteria and the like is ensured, the seed itself is not detrimentally acted upon. If desired dye-stuffs may be added to the mixture.

In a modified form of preparing the said mercurized products, instead of the alkali metal salts of phenol-mercuric-hydroxides, alkali metal salts of complex phenol-mercuric-salts are used, such as, for example, the alkali metal salts of cresol-mercuric-sulfate, the solutions of which are evaporated to dryness in a vacuum.

In this case there are produced the same compounds as in the evaporation of alkali metal salts of phenol-mercuric-oxide, although in admixture with the alkali metal salts—split off during evaporation—of the acid, the mercuric salt of which has been used in the preparation of the parent material.

This contamination, however, is of no consequence, since, the salts being intended for treating seed in order to destroy noxious agents such as bacteria and the like, alkali salts must be added in any case, in order to reduce the content of mercury in the products, as already above referred to.

Instead of the mercurized compounds above referred to certain more stable derivatives of these compounds can be used as constituents of the new compositions of matter. These derivatives are obtained by adding to the solutions above referred to, before evaporating, salts capable of reacting with the HgOH-group, such as sulfites or cyanides of the alkali metals. The composition of the products thus obtained corresponds, in the case of ordinary phenol, to the formulæ

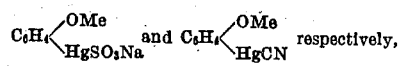

Me meaning an alkali metal.

Apart from their being unaffected by air, as already stated, the new compositions of matter are excellently adapted for use in treating seeds owing to their ready solubility, but, above all, because they have a substantially stronger effect than the products hitherto known for this purpose. On blight spores, for example, the effect is ten times stronger than that of the products obtained by the action of mercuric salts upon phenols.

The following examples illustrate the invention:—

*Example 1.*—10.8 kilos of commercial cresol are dissolved in 10 litres of water, while adding 8 litres of caustic soda solution of 40° Baumé specific gravity; into this solution 21.6 kilos of freshly precipitated mercuric oxide are introduced, while moderately heating and stirring. The resultant solution is filtered, leaving a slight residue, and a saturated solution of 14.2 kilos of crystallized sodium sulfite is then added. The solution is evaporated in a vacuum at a moderate temperature. The dry salt magma thus obtained is triturated with common salt or sodium sulfate, while adding dyestuff, so that the content of mercury in the final product is 17.5 per cent. The composition of the mercurized product corresponds to the formula

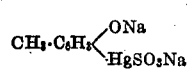

*Example 2.*—10.8 kilos of cresol are dissolved in 10 litres of water, while adding 8 litres of caustic soda solution of 40° Baumé specific gravity and into the solution 21.6 kilos of mercuric oxide are introduced, while heating and stirring. 4.9 kilos of sodium cyanide are then added and the resultant clear solution is evaporated to dryness in a vacuum. The residue thus obtained is triturated with common salt, while adding dyestuff, until the content of mercury is 17.5 per cent. The composition of the mercurized product corresponds to the formula

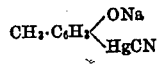

*Example 3.*—10.8 kilos of cresol are dissolved with caustic soda solution and treated with mercuric oxide according to Example 2. The resultant solution is filtered from the slight residue and evaporated in a vacuum. A colorless salt magma is obtained, the mercury content of which is adjusted to 17.5 per cent by triturating with common salt, while adding dyestuff. The composition of the mercurized product corresponds to the formula

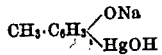

*Example 4.*—10.8 kilos of cresol are treated with a solution of 21.6 kilos of mercuric oxide in 10 kilos of sulfuric acid, while adding water. The crystalline magma of cresol-mercuric sulfate thus obtained is dissolved in caustic soda solution and the solution evaporated in a vacuum. The composition of the mercurized product is the same as in Example 3.

What I claim is:—

1. The herein described compound for treating seed in order to destroy noxious agents, such as bacteria and the like, said compound comprising a stable alkali metal salt of a mercurized monohydroxybenzene, said salt being soluble in water.

2. The hereindescribed compound for treating seed in order to destroy noxious agents, such as bacteria and the like, said compound comprising a stable alkali metal salt of a cyan mercuri derivative of a phenol, said salt having the formula

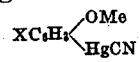

Me meaning an alkali metal and X hydrogen or an alkyl.

3. The hereindescribed compound for treating seed in order to destroy noxious agents, such as bacteria and the like, said compound comprising a stable alkali metal salt of mercurized cresol, said salt being soluble in water.

4. The hereindescribed compound for treating seed in order to destroy noxious agents, such as bacteria and the like, said compound comprising a stable alkali metal salt of a cyan mercuri derivative of cresol, said salt having the formula

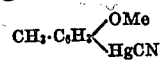

Me meaning an alkali metal.

In testimony whereof I have affixed my signature.

AUGUST KLAGES.